United States Patent [19]

McCulloch

[11] Patent Number: 5,262,144

[45] Date of Patent: Nov. 16, 1993

[54] SILICEOUS MOLECULAR SIEVES HAVING LOW ACID ACTIVITY AND PROCESS FOR PREPARING SAME

[75] Inventor: Beth McCulloch, Clarendon Hills, Ill.

[73] Assignee: UOP, Des Plaines, Ill.

[21] Appl. No.: 813,634

[22] Filed: Dec. 26, 1991

[51] Int. Cl.⁵ ............... C01B 33/20; B01J 20/18
[52] U.S. Cl. ............... 423/328.2; 423/332; 423/334; 502/407; 502/411; 502/414
[58] Field of Search ............ 502/64; 423/328, 332, 423/334

[56] References Cited

U.S. PATENT DOCUMENTS

| | | | |
|---|---|---|---|
| 2,985,589 | 5/1961 | Broughton et al. | 210/34 |
| 3,706,812 | 12/1970 | De Rosset et al. | 260/674 SA |
| 4,073,865 | 2/1978 | Flanigen et al. | 423/339 |
| 4,340,503 | 7/1982 | Rao et al. | 501/177 |
| 4,435,516 | 3/1984 | Chang et al. | 502/77 |
| 4,455,445 | 6/1984 | Neuzil et al. | 585/820 |
| 4,542,117 | 9/1985 | Morris et al. | 502/66 |
| 5,052,561 | 10/1991 | Miller et al. | 502/66 |
| 5,053,372 | 10/1991 | Brownscombe | 502/60 |
| 5,147,526 | 9/1992 | Kukes et al. | 208/143 |
| 5,159,128 | 10/1992 | Forschner et al. | 585/653 |

FOREIGN PATENT DOCUMENTS 2003740 11/1989 Canada .
2004430 12/1989 Canada .

*Primary Examiner*—Anthony McFarlane
*Attorney, Agent, or Firm*—Thomas K. McBride; John F. Spears, Jr.; Jack H. Hall

[57] ABSTRACT

The present invention relates in general to highly siliceous zeolitic molecular sieve adsorbent compositions having reduced catalytic activity and to the process for preparing such compositions. The number of acid sites in the so-called silica molecular sieves is very low, but exhibit a disproportionately high acid activity. In a variety of adsorptive separation applications in which the hydrophobic character of these molecular sieves is important, undesirable catalytic conversion of one or more of the adsorbates is frequently encountered. This acid activity is effectively eliminated by incorporating a stoichiometric excess with respect to the aluminum content of the molecular sieve of an alkali metal compound into the molecular sieve followed by calcining the loaded silicalite at temperatures of at least 750°C. The adsorbent is particularly useful in separations of materials which are subject to catalytically initiated reactions, e.g., olefins and alcohols.

9 Claims, No Drawings

SILICEOUS MOLECULAR SIEVES HAVING LOW ACID ACTIVITY AND PROCESS FOR PREPARING SAME

FIELD OF THE INVENTION

The present invention relates in general to highly siliceous zeolitic molecular sieve compositions having a very low catalytic acid activity and to the process for preparing such compositions. More particularly, the invention relates to aluminosilicate molecular sieves having bulk $SiO_2/Al_2O_3$ molar ratios of at least about 700 and which have been treated with an alkali metal compound and subsequently calcined at a temperature greater than 750° C. to effectively eliminate the acid catalytic activity associated with both framework and non-framework aluminum moieties.

BACKGROUND OF THE INVENTION

Crystalline zeolitic molecular sieves prepared by hydrothermal crystallization from reaction mixtures containing organic templating agents can, in general, be prepared in forms more highly siliceous than those which are synthesized in the absence of the organic reagents. It has been proposed that the crystallization mechanisms are different. In the case of the low-silica species, the mechanism involves the formation of stabilized metal cation aluminosilicate complexes and is controlled largely by the aluminate and aluminosilicate solution chemistry. In the case of the highly siliceous molecular sieves, a true templating or clathration mechanism is involved in which the organic reagent, typically an alkylammonium cation, forms complexes with silica via hydrogen bonding interactions. These complexes template or cause replication of the structure via stereo-specific hydrogen bonding interaction of the quaternary ammonium cation with the framework oxygens. Whatever the synthesis mechanism, the templated crystal structures in many instances can be directly synthesized over a very wide range of silica alumina $(SiO_2/Al_2O_3)$ ratios. At the extreme upper end of the range, the compositions are essentially silica polymorphs containing no $AlO_2$ tetrahedra in their framework structure. These highly siliceous molecular sieves, particularly those having $SiO_2/Al_2O_3$ molar ratios of 200 or greater, are highly hydrophobic and strongly organophilic. As such, they have found extensive use in molecular sieve separations involving organic substrates, particularly those in which water vapor cannot be entirely excluded from contacting the adsorbent.

The separation of normal $C_4$ hydrocarbons from isobutylene, with silicalite was disclosed in Neuzil et al U.S. Pat. No. 4,455,445. The patentees stated that undesired side effects of olefin dimerization and polymerization could be substantially completely eliminated. However, with the need for more and more highly purified olefinic monomers for production of advanced polymers, the standards for permissible catalytic polymerization side effects have been lowered. Producers of polymers, detergents, etc., are demanding monomers having virtually no reactivity as determined by the "Parr Bomb" test, infra.

It is found, however, that despite the low concentration of acidic sites in highly siliceous molecular sieves due to the low concentration of $AlO_2$ tetrahedral units in the structure, the relatively few such sites which are present posses a very considerable acid strength and the molecular sieve can exhibit a very significant catalytic activity. Moreover, even zeolitic or silica molecular sieves which have $SiO_2/Al_2O_3$ ratios greatly in excess of 200 are reactive because of the ubiquitous presence of aluminum impurities in the silica and other reagents employed in the synthesis. Even if only a fraction of this impurity aluminum is incorporated into the crystal lattice, the remaining aluminum-containing compounds occluded in the pore system of the crystal structure are believed to exhibit at least some catalytic activity. Accordingly, in adsorptive separation processes using these molecular sieves, it is frequently found that the adsorbed constituents of the mixture being separated are, to an undesirable degree, converted to objectionable species which reduce the purity of the separated products.

Several previous attempts to reduce the acid-catalytic activity of silicalite have been reported. In Flanigen et al U.S. Pat. No. 4,073,865, the F-silicalite polymorph reported there has a reduced tendency to catalyze reactions of the feed in the presence of surface hydroxyl groups of adsorbed water. However, F-silicalite is very difficult and expensive to make.

In Canadian Patent 2,004,430, certain zeolite compositions were disclosed for use in the separation of n-olefins and n-paraffins from branched-chain olefins and paraffins, aromatic hydrocarbons and sulfur-containing compounds. The adsorbent used in the separation process of the patent is exemplified by silicalite which is first acid-treated and then base-treated. Canadian Patent 2,003,740 contains a similar disclosure. Both patents disclose several methods of preparation of the treated adsorbents, e.g., silicalite or ZSM-5 first treated with an acid and then treated with NaOH or anhydrous ammonia.

The separations referred to herein can be practiced in fixed or moving adsorbent bed systems or a countercurrent simulated moving bed system, such as described in Broughton U.S. Pat. No. 2,985,589, incorporated herein by reference and Neuzil et al, supra. Equipment utilizing these principles are familiar, in sizes ranging from pilot plant scale (deRosset U.S. Pat. No. 3,706,812) to commercial scale in flow rates from a few cc per hour to many thousands of gallons per hour.

SUMMARY OF THE INVENTION

It has now been discovered that the low residual acid catalytic activity of highly siliceous molecular sieves can be essentially eliminated by incorporating an alkali metal in the internal pore system of a molecular sieve having a bulk $SiO_2/Al_2O_3$ ratio of at least about 700 from an alkali metal compound which is decomposable at a temperature below 550° C. to produce non-alkali metal decomposition products which are in the vapor phase, the quantity of alkali metal incorporated in said molecular sieve being in the range of from about 1.0 to about 1.5 moles per mole of bulk aluminum in the starting zeolite. The process of making the molecular sieve having essentially no acid catalytic as determined by the production of less than 0.1% new heavy components from a $C_5$olefin feed or less than 0.3% of internal olefins formed from a $C_6$ olefin feed in the Parr Bomb Test comprises adding a thermally decomposable alkali metal compound to a crystalline aluminosilicate molecular sieve having a $SiO_2/Al_2O_3$ ratio of at least 700 in hydrogen form and heating or calcining the molecular sieve thus produced at a temperature of at least about 750° C. until the alkali metal compound is decomposed.

The molecular sieves of the invention are particularly useful as adsorbents for the liquid phase separation of materials which are reactive in the presence of a catalyst, e.g., olefins, alcohols, etc.

DETAILED DESCRIPTION OF THE INVENTION

The siliceous molecular sieves suitably treated in accordance with the present invention are those microporous crystalline aluminosilicates which have bulk $SiO_2/Al_2O_3$ ratios of at least about 700. As used herein, the term "aluminosilicate" is inclusive of crystal structures which contain any framework $AlO_2$ tetrahedra in addition to $SiO_2$, even though the amount of tetrahedral framework aluminum is not crystallograhically significant. The bulk $SiO_2/Al_2O_3$ ratio of the aluminosilicate includes both framework aluminum and non-framework aluminum, the latter usually being present in octahedral coordination with oxygen and being principally occluded alumina. Thus, the so-called silica polymorphs, silicalite, described in detail in U.S. Pat. No. 4,061,724, and TEA-silicalite, described in U.S. Pat. No. 4,104,294, are within the term "aluminosilicate" as used in the specification and the appended claims. Other zeolites which can be directly synthesized to have very high $SiO_2/Al_2O_3$ ratios include zeolite beta (U.S. Pat. No. 3,308,069), zeolite ZSM-5 (U.S. Pat. No. 3,702,886), zeolite ZSM-11 (U.S. Pat. No. 3,709,979), zeolite ZSM-35 (U.S. Pat. No. 4,016,245), zeolite ZSM-23 (U.S. Pat. No. 4,076,842) and zeolite ZSM-38 (U.S. Pat. No. 4,046,859), to name only a few. Also included as starting materials in the practice of the present invention are those zeolites which, while not being capable of being directly synthesized to have sufficiently high $SiO_2/Al_2O_3$ ratios, can nevertheless be dealuminated after synthesis to meet the requirements set forth above. For example, high temperature steaming procedures for treating zeolite Y to create highly siliceous forms of this faujasite-type zeolite are reported by P. K. Maher et al, "Molecular Sieve Zeolites," Advan. Chem. Ser. 101, American Chemical Society, Washington, D.C., 1971, page 266. A more recently reported procedure applicable to zeolite species generally involves dealumination and the substitution of silicon into the dealuminated lattice sites. This process is disclosed in U.S. Pat. No. 4,503,023.

Catalytic activity, as used herein, is determined by a simple test, called a Parr Bomb Catalytic Reactivity Test, which is an order of magnitude more sensitive to such reactivity than current conventional tests, such as the Butane Cracking Activity procedure. The procedure is as follows: 10 grams of silicalite material is contacted with 20 cc of an olefin feed for 16 hours at 175° C. A screening test has been devised to determine how much isomerization of 1-hexenes to internal hexenes occurs in a $C_6$ feed or the extent of formation of heavy components to products greater than $C_6$ in a $C_5$ feed. The heavy components are polymerization or oligomerization products and their formation leads to rapid adsorbent deactivation. The level of catalytic activity of the adsorbent is determined by the amount of new products formed during the test, as observed by GC. The adsorbents of this invention are characterized by less than 0.1 wt. % conversion of a $C_5$ feed to new materials heavier than the feed and/or less than 0.3 wt. % products of isomerization of the 1-olefins in a $C_6$ feed to internal olefin isomers.

By way of comparison, a commercially-available olefin feedstock containing predominantly $C_5$ olefins, including cyclopentene was chromatographically analyzed and was found to contain 21 components, all of which had retention times (peaks), on the chromatographic adsorbent, of 20.00 min. or less. After the feed was contacted with a clay-bonded silicalite (S-115 available from UOP), which was dried at 800° C., the feed was again analyzed. The chromatogram indicated that significant isomerization had taken place through conversion of isomerizable components in the feed, e.g., 1-hexene to internal olefins. Isomerization is observed by noting how much of the isomerizable olefins, e.g., 2-methyl-butene-1, remains in the eluted feed. Considerable oligomerization had also taken place as observed by formation of heavy products which have a retention time of 20 min. or greater in the chromatogram. The feed which had been contacted with silicate S-115 in the above procedure was determined to have 75 new peaks with retention times of 20 min. or longer accounting for over 9% of the eluted feed in addition to the isomerization products, indicating that the silicalite adsorbent was very reactive.

The adsorbents of the invention are also believed to be relatively free of pore-obstructing impurities, including non-lattice aluminum and/or residual salt from the ion exchanged medium. Other materials which may clog the pores may be reaction products of the ion exchange salt with impurities in the as-synthesized form of the silicalite. It has previously been known that acid-washing will reduce the aluminum content (both framework and non-framework) and hence acid catalytic sites. Such prior treatment is beneficial to the present invention, but not believed to be essential. Acid-washing, however, will not completely eliminate the catalytic activity. The critical steps, whether or not the adsorbent has been previously washed with an acid and/or base, are to calcine the adsorbent, containing a decomposable alkali metal ion, at high enough temperatures to completely rid the pores of obstructing materials and reactive sites. An acid-washed silicalite that was soda-loaded and then calcined at 550° C. exhibited residual olefin catalytic activity and also a "normal" $N_2$ adsorption isotherm. An identical sample that was soda-loaded and then calcined at 850° C. showed no olefin reactivity in the Parr Bomb Test. The invention may further be practiced by adding the alkali metal in the binder material provided the binder material contains sufficient amounts of an alkali metal as a thermally decomposable compound. An unwashed sample of silicalite (S-115), to which was added a binder comprising a silica sol and tetrasodium pyrophosphate was then calcined at 840° C. for 1 hour showed no olefin reactivity in the Parr Bomb Test (i.e., no conversion of 1-hexene to internal olefins was detected) using a $C_6$ olefin feed.

The thermally decomposable alkali metal compounds suitably employed include sodium bicarbonate, sodium phenoxide, sodium methoxide, sodium hyponitrite, sodium iodate, sodium tartrate, sodium thiosulfate, tetra sodium pyrophosphate, potassium hypochlorite, potassium carbonate, potassium nitride, potassium oxalate, potassium succinate, rubidium bicarbonate, rubidium dichlorobromide and rubidium sulfate. In general, the salts of alkali metals and organic acids are all suitable since the organic moieties decompose to form water vapor and carbon dioxide.

The manner of incorporating the decomposable alkali metal compound into the inner cavities of the molecular sieve crystal is not narrowly critical and can be accomplished by any of the methods well known in the art. Advantageously, the crystals of the molecular sieve, either in powder form or as bonded agglomerates, are immersed in or otherwise contacted with an aqueous solution of the alkali metal compound whereby the pores of the molecular sieve become filled with the solution, and the molecular sieve thereafter is dried in air prior to calcination. It is also feasible to simply mill together the molecular sieve crystals or agglomerates with the particles of the alkali metal compound, if solid, or directly apply the compound, if liquid, to the molecular sieve without the use of a solvent medium. As mentioned hereinabove, the alkali metal compound may be incorporated as the binder material or a component thereof. When using the dry milling technique, care should be exercised to avoid undue fracture of the molecular sieve particles or crystals. The relative proportions of molecular sieve and alkali metal compound are determined by the bulk aluminum content of the molecular sieve. It is found that at least about 1 mole of sodium per mole of aluminum must be employed, but that the molar ratio of Na/Al should not exceed about 1.5, preferably, not exceed about 1.3.

It is an important aspect of the present invention that the zeolite incorporating the alkali metal compound be calcined at a temperature of at least 750° C. to completely decompose the alkali metal compound and remove the non-metallic vaporous decomposition products from the micropore system of the molecular sieve and the macropores of the bonded agglomerate, if bonded agglomerates are employed. It has unexpectedly been found that the calcination temperature may exceed the temperature at which the alkali metal compounds normally cause fluxing action without damaging the crystalline structure. Calcination temperatures as high as 1000° C. have been used without adverse effect on the crystallinity of the silicalite of the molecular sieve. The calcination step, following loading the molecular sieve with the alkali metal compound, appears to remove all materials, such as sodium or aluminum atoms or other impurities or debris, which could block pores and becomes acid-catalytic sites, from the molecular sieve.

The calcination medium employed can be any which is not destructively reactive with the molecular sieve. Air or other oxygen-containing mixtures are advantageously used to aid in the decomposition of the alkali metal compound and the conversion of the non-metal moiety to volatile products.

The invention is illustrated by the following examples.

EXAMPLE I

The following procedure was used to make an adsorbent in accordance with the invention. A 9.0 lb. sample of silicalite (S-115 from UOP) made by the general procedure taught in Grose et al U.S. Pat. Nos. 4,061,724 and 4,104,294 having a bulk $SiO_2/Al_2O_3$ ratio of 700 was acid-washed with HCl and filtered. The filtered material, after drying at 100° C., had a pH of 3.6. The filtered material was combined with an aqueous silica sol (Nalco 1034A) and conventional additives to aid extrusion. The material was mulled and extruded through a 1/16" die and dried at 100° C. for 1 hour before being treated in accordance with this invention. The silicalite material was then mixed with a 50% molar excess (based on the total aluminum atoms in the sample) of $NaHCO_3$ and water and was calcined according to the following schedule: raise the temperature to 550° C. and hold at 550° C. for 1 hour; raise the temperature to 840° C. and hold at 840° C. for 1 hour. The adsorbent thus produced had a bulk $SiO_2/Al_2O_3$ ratio of 700, Langmuir surface area of 564 m²/g and total pore volume of 0.201 cc/g. The sodium content of the adsorbent was 0.14 wt. %. The results of the reactivity tests using the above Parr Bomb procedure with a $C_6$ feed (composition set forth in Table 1) were as follows: no conversion of 1-hexene to internal hexene isomers was detected. Another adsorbent made by the above procedure was tested for reactivity on a $C_5$ olefin feed (composition set forth in Table 2) with the following results: 0.1 wt. % of the olefins were converted to heavy products.

TABLE 1

| $C_6$ FEED COMPOSITION | |
|---|---|
| 1-hexene | 86.9 |
| 2-methyl-1-pentene | 6.4 |
| 3-methyl pentane | 3.3 |
| n-hexane | 0.1 |
| 2-ethyl-1-butene | 0.7 |
| 3-methyl pentane | 1.0 |
| 3-methyl-1-pentane | 0.2 |
| 4-methyl-1-pentene | 0.1 |
| Unknown | 0.9 |
| Unknown | 0.4 |
| TOTAL | 100.0 |

EXAMPLE II

The adsorbent made in Example 1 was used in a pulse test as described in the patent literature, e.g., Zinnen et al U.S. Pat. No. 4,642,397, incorporated by reference herein, to separate a mixture of $C_5$ olefins having the composition shown in Table 2 below. The desorbent was methylcyclohexane. The separation column containing 70 cc of the adsorbent was maintained at a temperature of 160° C. and a pressure to provide liquid-phase operation. The desorbent material was run continuously at a nominal liquid hourly space velocity (LHSV) of 1 (1.36 ml per minute flow rate). At some convenient time interval, the desorbent was stopped and a 2 cc sample of an 80/20 wt. % mixture of the feed and mesitylene (as tracer) was injected for a 1.5 minute interval at a rate of 1.36 ml/min. The desorbent stream was then resumed at 1 LHSV and continued to pass into the adsorbent column until all of the feed components had been eluted from the column as determined by analyzing the effluent stream leaving the adsorbent column. The branched-chain olefins were removed as raffinate near the void volume and the normal olefins were desorbed thereafter. The results of the separation are also set forth in the following Table 2 under the headings gross retention volume (GRV), net retention volume (NRV) and selectivity ($\beta$).

TABLE 2

| Component | Wt. % in Feed | GRV (ml) | NRV (ml) | Selectivity $\beta$ |
|---|---|---|---|---|
| Mesitylene | — | 38.9 | 0.0 | ∞ |
| 2-Methyl-2-butene | 41.19 | 40.02 | 1.3 | 17.64 |
| 2-Methyl-1-butene | 8.38 | 40.8 | 1.9 | 12.70 |
| 3-Methyl-1-butene | 0.28 | 41.3 | 2.4 | 10.10 |
| Cyclopentene | 2.63 | 42.8 | 3.9 | 6.6 |
| Cyclopentene | 2.63 | 42.8 | 3.9 | 6.6 |
| n-pentane | 0.16 | 53.3 | 14.4 | 1.66 |
| Cis-2-pentene | 16.62 | 53.5 | 14.6 | 1.63 |
| Trans-2-pentene | 25.17 | 61.4 | 22.5 | 1.06 |

TABLE 2-continued

| Component | Wt. % in Feed | GRV (ml) | NRV (ml) | Selectivity β |
|---|---|---|---|---|
| Pentene-1 | 4.94 | 62.7 | 23.8 | 1.00 (Ref.) |

EXAMPLE III

Another pulse test was run to demonstrate the separation of other reactive materials by the adsorbent of the invention. In this case, the feed was a mixture of normal and branched-chain $C_{14}$ and $C_{15}$ alcohols having the composition set forth in Table 2. The adsorbent starting material was a laboratory made silicalite similar to the one described in Example I. Sodium bicarbonate (6.8 g) and water (558.7 g) was added to 13709 of the extrudate (pellets) and mixed until uniformly wet. The soda-loaded silicalite was then calcined according to the following schedule: the temperature was raised from room temperature to 550° C. at a rate of 10 degrees per minute; was held at 550° C. for 1 hour; raised to 840° C. at 5 degrees per minute and held at 840° C. for 1 hour. In the Parr Bomb reactivity test conducted on this adsorbent material at 150° C. for 2 hours with 1-hexanol, one new peak at RT=2.73 was formed. The adsorbent so produced had a bulk $SiO_2/Al_2O_3$ ratio of 700, Langmuir surface area of 535 m²/g and a total pore volume of 0.201 cc/g. The pulse test column was filled with the adsorbent and the pulse test conducted as above using 1-hexanol as desorbent at 150° C. all other conditions being the same except that the feed pulse contained 44% feed, 44% 1-hexanol and 12% mesitylene (as tracer) was injected for a 1.5 minute interval at a rate of 1.3 ml/min. The normal alcohols were adsorbed while the branched-chain alcohols (i-$C_{15}$OH, etc.) were removed as raffinate near the void volume. The normal alcohols (n-$C_{15}$OH) were desorbed thereafter, as shown by the results in the following Table 3.

TABLE 3

| Component | Wt. % in Feed | GRV (ml) | NRV (ml) | Selectivity β |
|---|---|---|---|---|
| Mesitylene | 16 | 44.5 | 0.0 | ∞ |
| i-$C_{15}$OH | 1.7 | 44.8 | 0.3 | 52.56 |

TABLE 3-continued

| Component | Wt. % in Feed | GRV (ml) | NRV (ml) | Selectivity β |
|---|---|---|---|---|
| i-$C_{15}$OH | 1.7 | 44.8 | 0.4 | 41.83 |
| i-$C_{14}$OH | 5.9 | 45.3 | 0.8 | 18.10 |
| i-$C_{15}$OH | 5 | 45.6 | 1.1 | 13.38 |
| i-$C_{15}$OH | 2.5 | 45.7 | 1.3 | 12.01 |
| i-$C_{14}$OH | 1.7 | 45.7 | 1.3 | 12.13 |
| i-$C_{15}$OH | 1.7 | 46.2 | 1.8 | 8.57 |
| i-$C_{15}$OH | 29.8 | 57.2 | 12.8 | 1.20 |
| i-$C_{14}$OH | 34 | 59.8 | 15.3 | 1.00 |

What is claimed:

1. A process for making a silicalite having essentially no acid catalytic activity as determined by the production of less than 0.1% $C_5$-plus components from a $C_5$ olefin feed or less than 0.3% internal olefins formed from a $C_6$ olefin feed in a Parr Bomb Test said process comprising placing a thermally decomposable alkali metal compound in the pores of a silicalite and calcining said silicalite at a temperature of at least 750° C.

2. The process of claim 1 wherein said silicalite is selected from the group consisting of TEA silicalite, and F-silicalite.

3. The process of claim 1 wherein said alkali metal compound is sodium bicarbonate.

4. The process of claim 1 wherein said pores are filled with a stoichiometric excess of up to 50% of said alkali metal compound based on the total aluminum content of the silicalite.

5. The process of claim 1 wherein said alkali metal compound is selected from the group consisting of sodium bicarbonate, sodium phenoxide, sodium methoxide, sodium hyponitrite, sodium iodate, sodium tartrate, sodium thiosulfate, tetra sodium pyrophosphate, potassium hypochlorite, potassium carbonate, potassium nitride, potassium oxalate, potassium succinate, rubidium bicarbonate, rubidium dichlorobromide and rubidium sulfate.

6. The process of claim 1 wherein said calcining temperature is from 750° C. to 1000° C.

7. The process of claim 6 wherein said calcining temperature is from 800° C. to 850° C.

8. The process of claim 1 wherein the silicalite is dried before calcining.

9. The process of claim 1 wherein said silicate is in hydrogen form and is obtained by washing said silicalite with an acid before adding said thermally decomposable alkali metal compound.

* * * * *